United States Patent [19]
Pryor

[11] Patent Number: 6,044,183
[45] Date of Patent: *Mar. 28, 2000

[54] ROBOT VISION USING TARGET HOLES, CORNERS AND OTHER OBJECT FEATURES

[75] Inventor: Timothy R. Pryor, Windsor, Canada

[73] Assignee: Laser Measurement International Inc., Windsor, Canada

[ * ] Notice: This patent is subject to a terminal disclaimer.

[21] Appl. No.: 08/468,358

[22] Filed: Jun. 6, 1995

Related U.S. Application Data

[62] Division of application No. 08/203,603, Feb. 28, 1994, Pat. No. 5,956,417, which is a continuation of application No. 07/697,345, May 9, 1991, abandoned, which is a continuation of application No. 07/451,958, Dec. 14, 1989, abandoned, which is a continuation of application No. 07/268,685, Nov. 7, 1988, abandoned, which is a continuation of application No. 07/143,271, Jan. 7, 1988, abandoned, which is a continuation of application No. 06/933,256, Nov. 20, 1986, abandoned, which is a continuation of application No. 06/660,042, Oct. 12, 1984, abandoned, which is a continuation-in-part of application No. 06/348,803, Feb. 16, 1982, abandoned.

[51] Int. Cl.[7] ....................................................... G06K 9/36
[52] U.S. Cl. ................................. 382/287; 382/291
[58] Field of Search ............................ 382/151, 103, 382/104, 106, 141, 153, 154, 286, 287, 291; 348/94; 702/150, 152

[56] References Cited

U.S. PATENT DOCUMENTS

| | | | |
|---|---|---|---|
| 3,230,308 | 1/1966 | Lewczyk | 178/6.8 |
| 3,567,853 | 3/1971 | Green | 178/6.8 |
| 3,619,499 | 11/1971 | Petrocelli | 178/7.85 |
| 3,622,396 | 11/1971 | Fernandez et al. | 136/176 |
| 3,653,769 | 4/1972 | Albright | 356/141 |
| 3,804,270 | 4/1974 | Michaud et al. | 214/16 B |
| 3,837,198 | 9/1974 | Higgins | 72/9 |
| 3,876,308 | 4/1975 | Alpers | 356/152 |
| 3,986,007 | 10/1976 | Ruoff, Jr. | 235/151.1 |
| 4,044,377 | 8/1977 | Bowerman | 358/107 |
| 4,120,095 | 10/1978 | Lobourg | 33/174 N |
| 4,146,924 | 3/1979 | Birk et al. | 382/153 |
| 4,218,616 | 8/1980 | Loomer | 250/223 R |
| 4,219,847 | 8/1980 | Pinkney et al. | 358/126 |
| 4,254,433 | 3/1981 | Dewar, Jr. et al. | 358/105 |
| 4,260,187 | 4/1981 | Bejczy | 294/86 R |
| 4,270,649 | 6/1981 | Mayer | 198/341 |
| 4,305,661 | 12/1981 | Pryor | 356/241 |
| 4,334,241 | 6/1982 | Kashioka et al. | 358/107 |
| 4,349,837 | 9/1982 | Hinds | 358/93 |
| 4,380,696 | 4/1983 | Masaki | 219/124.34 |

(List continued on next page.)

FOREIGN PATENT DOCUMENTS 2 128 772  5/1984  United Kingdom  ........... G05B 19/18

OTHER PUBLICATIONS

*Vision–Controlled Subassembly Station*, McGhie et al., SRI International, Oct. 1978, 15 pages.

5th International Symposium on Industrial Robots, "Vision Target Locator", pp. 487–492, Bowerman et al., GTE Laboratories, Inc., Sep. 22–24, 1975.

*NASA Technical Paper* 1819, "Marking Parts to Aid Robot Vision", Bales et al, Apr. 1981, 33 pages.

*Primary Examiner*—Andrew W. Johns
*Attorney, Agent, or Firm*—Larson & Taylor

[57] ABSTRACT

A method and apparatus uses naturally occurring object features as targets in a machine vision based robot (or other) guidance system. In one embodiment, a special high speed processor finds at least 3 pre-selected feature points on an object, which when considered with the data base for the object, allows a rapid 6 degree of freedom solution for the object location relative to the camera and thence connected automation. While primarily envisioned for industrial robots, the invention is useful for all sorts of machines including vehicles, construction machinery and the like—anywhere the target object has a known data base relative to the features in question.

52 Claims, 4 Drawing Sheets

U.S. PATENT DOCUMENTS

| | | | |
|---|---|---|---|
| 4,385,360 | 5/1983 | Yamada et al. | 364/514 |
| 4,437,114 | 3/1984 | LaRussa | 358/101 |
| 4,475,122 | 10/1984 | Green | 358/101 |
| 4,490,848 | 12/1984 | Beali et al. | 382/121 |
| 4,581,762 | 4/1986 | Lapidus et al. | 382/22 |
| 4,596,037 | 6/1986 | Bouchard et al. | 382/8 |
| 4,607,386 | 8/1986 | Morita et al. | 382/13 |
| 4,613,942 | 9/1986 | Chen | 364/513 |
| 4,630,225 | 12/1986 | Hisano | 364/559 |
| 4,652,917 | 3/1987 | Miller | 358/107 |
| 4,654,949 | 4/1987 | Pryor | 29/407 |
| 4,727,419 | 2/1988 | Yamada et al. | 358/101 |
| 4,731,856 | 3/1988 | Lloyd et al. | 382/8 |
| 4,753,569 | 6/1988 | Pryor | 414/730 |
| 4,759,072 | 7/1988 | Yamane et al. | 382/8 |
| 4,835,450 | 5/1989 | Suzuki | 318/568.13 |
| 4,907,169 | 3/1990 | Lovoi | 364/513 |
| 4,941,182 | 7/1990 | Patel | 382/1 |
| 4,942,539 | 7/1990 | McGee et al. | 364/513 |
| 4,998,209 | 3/1991 | Vuichard et al. | 364/513 |
| 5,380,978 | 1/1995 | Pryor | 219/121.64 |
| 5,586,058 | 12/1996 | Aloni et al. | 382/151 |

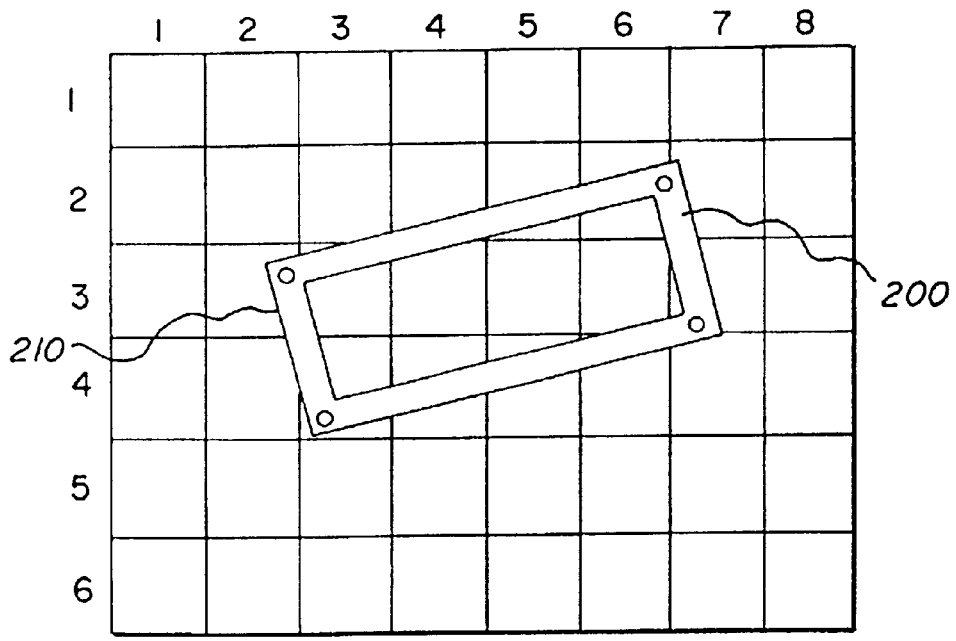
Fig. 3
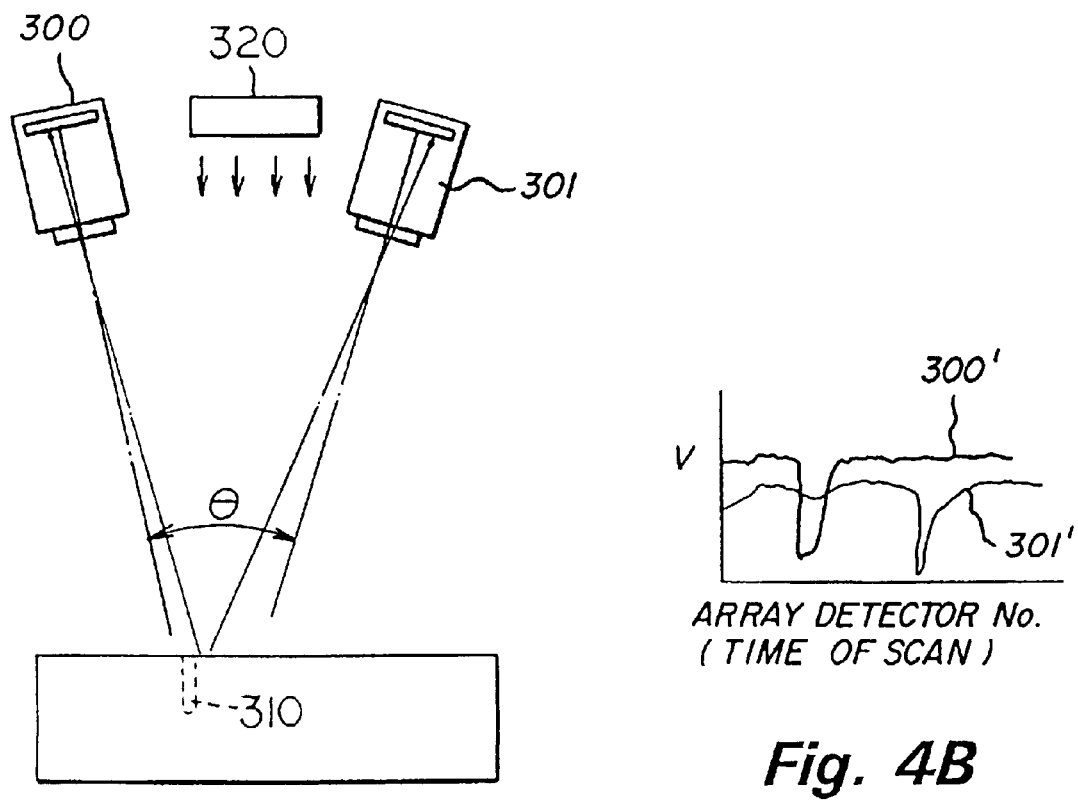
Fig. 4A
ARRAY DETECTOR No.
(TIME OF SCAN)
Fig. 4B

ROBOT VISION USING TARGET HOLES, CORNERS AND OTHER OBJECT FEATURES

RELATED APPLICATIONS

This application is a division of application Ser. No. 08/203,603 filed Feb. 28, 1994, now U.S. Pat. No. 5,956, 417; which was a continuation application of Ser. No. 07/697,345, filed May 7, 1991, now abandoned; which was a continuation application of Ser. No. 07/451,958 filed Dec. 14, 1989, now abandoned; which is a continuation application of Ser. No. 07/268,685 filed Nov. 7, 1988, now abandoned; which is a continuation application of Ser. No. 07/143,271 filed Jan. 7, 1988, now abandoned; which is a continuation application of Ser. No. 06/933,256 filed Nov. 20, 1986, now abandoned; which is a continuation application of Ser. No. 06/660,042 filed Oct. 12, 1984, now abandoned; which is a continuation-in-part of Ser. No. 06/348, 803 filed Feb. 16, 1982, abandoned in favor of Ser. No. 06/716,592 filed Mar. 19, 1985, now U.S. Pat. No. 4,654, 949.

BACKGROUND OF THE INVENTION

Recent copending applications by the inventor, incorporated by reference are as follows:

1. Ser. No. 348,803 "Method and Apparatus for Automatically Handling Assembly on Moving Objects" ("Targets") now U.S. Pat. No. 4,654,949
2. Ser. No. 453,910 "Robot Calibration"
3. Ser. No. 592,443 "Robots and Manipulator Arms"
4. Ser. No. 323,395 "Robot Tractors" now U.S. Patent No. 4,482,960
5. Robot Tractors, Vehicles, and Machinery (Ser. No. 651, 325)

These applications disclose novel means for achieving high accuracy, high speed and potentially low cost robot vision in up to 6 degrees of freedom using targets affixed on, or forming part of, an object. In particular, these applications disclose that it is desirable to construct a control system for a robot which can use certain features of an object to provide an accurate solution of a photogrammetric equation to allow up to 6 degrees of freedom determination of part location in space with a single camera or multiple cameras.

In the automotive industry particularly, holes in parts are natural features which generally have a precise dimensional relationship to the object as a whole. The reason for this is clear. Most of the holes are used for mounting the object to something else and in that case have to be in the proper position or the object itself will be out of position when so mounted. Examples of this include body panels, instrument panels, water pump covers, radiator brackets, etc.

In other cases, holes are there to allow the assembly of the part together with other parts for functional or decorative purposes. These could include rocker cover rail holes, rocker stud holes and cylinder heads, engine cylinder head bolt holes, various frame holes and the like. In short, a vast number of the parts of cars, appliances, aircraft and other things have holes as their principle feature. And in almost cases, these holes have been either molded, cast, machined or otherwise incorporated into the part in such a way as to be in a dimensionally accurate location, at lease accurate enough for the purpose of picking the part, working on it, handling it or what have you.

In Ser. No. 348,803 (Targets) previously filed, it was disclosed that the natural occurring holes in the part could be used as the targets. This is further elaborated on herein.

SUMMARY OF THE INVENTION

While holes are of particular interest, there are other features of objects (chosen object features) which can be used as "targets". For example, corners, edge segments, notches and other features, which are definable in more than one dimension can be considered. A particularly good example are the corners of objects such as automotive body panels, whose corners are particularly important for control and fitting purposes.

Obviously, all natural occurring indentations or protrusions and the like can be considered as well, and some of these were discussed in the previous cases. It is also noted that combinations of features can be used such as 2 holes and 2 corners of a part for example, to comprise the 3, 4 or more targets suitable for the invention.

Returning n to the specific example of holes, there are basically several points that can be utilized to discern the holes. One must remember that a key point of this invention is that in order to allow a 6 degree of freedom solution such as shown in Pinkney et al (U.S. Pat. No. 4,219,847) to be made, one only needs to know the position of three or four holes in any one view. That is, one only has to locate those holes and generally no more. Other features such as edges and other character lines, etc., are of no meaning since those are all known relative to the hole locations. The key point is then to find the holes (corners, etc.) and to "lock on" them in a mode that the camera unit can stay locked onto the holes throughout whatever operation, such as handling or working, is contemplated.

This leads to several operational possibilities. While discussed relative to holes, the arguments are general to corners and other features.

1. Scan the total part image and find the holes. Once the holes are found, determine the shape of the hole, the size of the hole, or the relative locations of the holes; confining analysis to those holes which are to be considered as targets.

While it is desired on every part to use the same holes as targets, certain alternate holes or other features can be held in reserve in case the image of the principle target holes is obliterated or obscured. Once the holes are found, one need not scan other portions of the image. The sensory unit only needs to lock onto the holes.

2. Clearly, the above is probably the way to go in many cases. However, another clear case is where the boundaries of the part such as the edges of a basically rectangular cylinder head are known. Having found the edges of the part, one can immediately segment the image into sections and simply scan for holes in certain areas of the field of view. It is likely on a well manufactured part such as a cylinder head, that one could almost immediately go to the zone on which the desired holes were located and simply confirm that they are of roughly the right diameter so as to act as the target holes.

All holes are generally round and it is considered highly unlikely that non-round holes would be normally utilized in parts except for the purpose of target indicators. This naturally makes them easy to find as targets (if they are triangular, for example), but obviously would require special operations to put them there. One excellent example of this is to incorporate three or four triangular punches into a punch set used to punch out inner panels of car doors. If one just punches a few extra holes which are triangular or other odd shapes, one can immediately identify that those are the target holes in any view of that part.

Before getting further onto the control rationale, one can also make a point of saying that, in general, holes, corners and other features are front lit. In other words, the part cannot be illuminated from behind. For example, in the blind threaded rocker cover rail mounting holes in a cylinder head, one has to look at the reflected image from the front. Reflected images often do not give good contrast which requires a "front end" processor to help make up for this as discussed below.

In the cover rail case, the hole is clearly defined as being located at the surface in which it breaks and almost inevitably appears, in reflection, as a dark image on a bright (rail) background. Naturally, the brightness is dependent greatly on the lighting and the reflectivity of the part. But in all cases, one can light these parts so that the light comes back from the normal surface and is absorbed into the hole. It is extremely unlikely (except for the threaded reflective facets of a threaded hole at certain angles) that one gets a bright reflected image from a hole unless of course the hole is extremely shallow (and the bottom is seen, but this can be avoided by viewing at oblique angles).

The other principle case is backlit holes (or corners, etc.) as in a sheet metal stamping which has been punched out or a plastic part such as an instrument panel which has numerous through holes as well as several blind holes. The blind holes however are generally the mounting holes for the panel and are probably better controlled in their position relative to the rest of the perforated panel. However, the other holes can be used as well.

BRIEF DESCRIPTION OF THE DRAWINGS

The invention is illustrated by the following embodiments:

FIG. 3 illustrates a third embodiment of the invention illustrating a matrix data array segmentation scheme, with robot tracking.

FIG. 4A illustrates a two camera coincidence stereo embodiment and FIG. 4B graphically illustrates characteristic signatures of the two cameras.

DETAILED DESCRIPTION OF THE PREFERRED EMBODIMENTS

Figure 1:
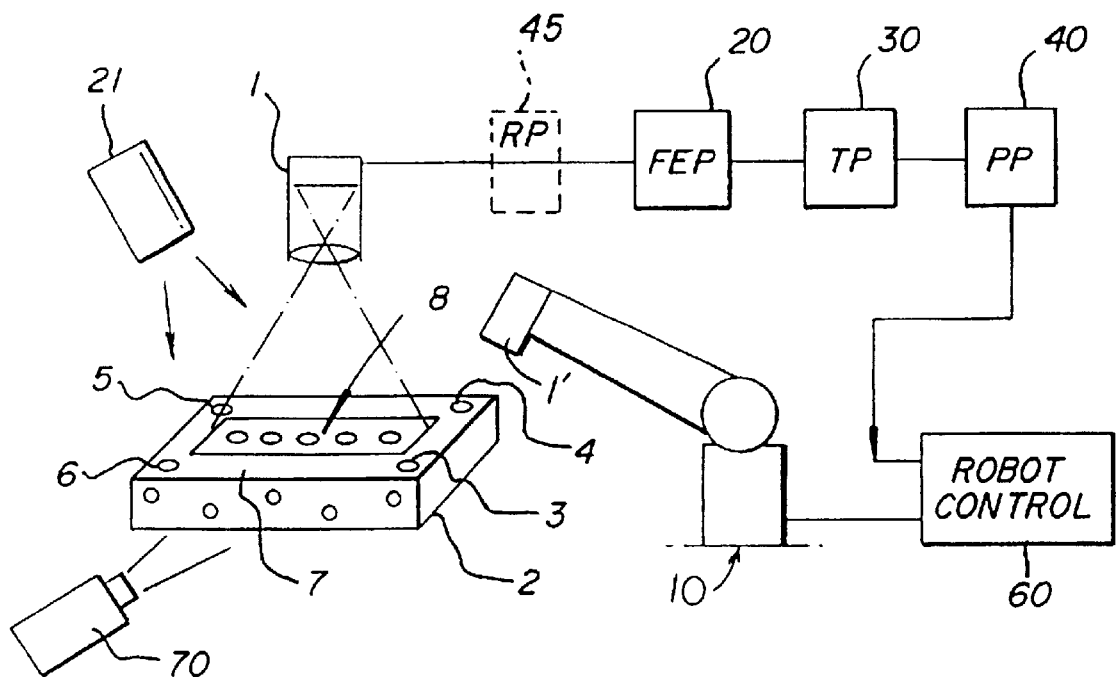
FIG. 1 schematically illustrates a first embodiment of the invention used to acquire and track rocker cover rail holes on a cylinder head.

In the drawings FIG. 1 shows a camera unit 1, typically a solid state TV or matrix array camera such as a GE TN2500. This camera unit scans the image of the part which in this case is a cylinder head 2 with rocker holes 3, 4, 5 and 6 in the rocker cover rail 7 together with numerous other holes in the middle of the head 2 such as group 8.

The camera 1 is connected in this case to a front end processor 20, or "FEP", which is used to do a very specific processing operation on the generalized image of the part illuminated. For example, in reflection using a light source 21, FEP 20 is used to determine the position of all holes of a diameter equal to the approximate diameter of chosen target holes, in this case, the rocker stud holes 3–6. Alternatively, the front end processor can also find the location of all holes which are situated at the corners of the part—often a good choice for target location and of course useful when corners are used as targets.

The location of the holes is made particularly easy since once one finds one hole, one generally can find the other three simply because one knows approximately from the part geometry an approximate spacing from the first hold found. This processing, that is looking for hold signatures of a particular type and location, is much easier than generalized image processing of reflective part images. This is a crucial point.

Once the target holes have been found by the front end processor 20, data as to target hole location coordinates are fed to the (optional) tracking processor "TP" 30. The tracking processor's sole function then is to lock the sensor unit 1 onto those holes as found and keep them locked on. At this stage, the front end processor 20 need not make any other particular judgements. Its function is now removed by the tracking processor 30. The TP 30 is not required unless the object 2 is in motion relative to the camera 1.

The turning over of the control to the tracking processor 30 clearly allows a much more higher speed operation to occur. For example, in acquiring the target holes, it could well be that because of poor lighting conditions (complex parts, dirty parts, cases where some targets were obscured, etc.), the front end processor 20 could even take as much as one second to make its analysis. Obviously, this is much less than the desired 15 Hz minimum update rate of the camera 1 and still less than the desirable 30 to 60 Hz operational rate of the tracking data. However, once the holes are located, the tracking processor 30 can keep them locked on easily.

Since the part 2 itself may be in motion relative to a camera 1 located on a robot 10 over a considerable duration of time and space while the robot does its various operations on the part (such as assembles to it, works on it or handles it), clearly the one second lost to determine target location at the beginning is minimal as long as high rate 15–30 Hz updates of coordinate position can be obtained thereafter.

From the target (and tracking) processor, the locked-on target data goes to the photogrammetric processor "PP" 40, which then solves the photogrammetric equations using the targets in the manner described in the Pinkney application and technical papers. From this, the general object location in up to six degrees of freedom relative to the camera is determined. Clearly, different solutions are utilized depending on which targets the FEP 20 and TP 30 have been able to acquire and lock onto. In other words, a normal equation set is utilized for the four rocker cover rail holes. However, special equation sets covering the use of three holes only, or three rocker cover rail holes and a rocker stud hole, or some other combination that might be necessary in certain instances, are stored in reserve and utilized if required. Corners and other non-hole features can also be used in this context as well.

Again, the reason that one can do this is that one knows a priori what that particular part's dimensions are. It can be obtained for example directly from the part prints and even down loaded into this system from a CAD data base. This is, of course, a truly simplifying situation suitable to modern manufacturing. Obviously, different target data sets can be used for different parts and the first step of the FEP 20 could be to actually identify the part 2 as to which one is present and then go through the acquiring of the target data representing that part. Indeed, the hole layout on the part 2 likely tells which part it is. Of the particular family of parts for example that can come by the robot station, one could identify them first from the hole location data and then utilize that to lock onto the particular target set called for by the equation for that part. In other words, one can optionally incorporate recognition processor "RP" 45, which first recognizes the part 2.

Note too that the optional CAD system can optionally be utilized to input data to the FEP 20 and RP 45. This CAD system can also specify any special targets which might be used in the part such as retro reflective tape, paint spots or otherwise (as discussed below).

Another use of the FEP 20 is to identify special part features put on the part 2 specifically as targets. This includes cast in reticles, machined in notches or identifications, raised or indented material in stampings, plastic, etc. When illuminated with ordinary light, the contrast of these features is often low relative to the part as a whole and a special processor is thus required to pick out the target 'signature'.

Naturally once the photogrammetric processor 40 has determined its data, it feeds the data to the robot control 60 which then controls the robot 10 to make its relative moves relative to the part 2. This position data is in up to 6 axis (x, y, z, roll, pitch, yaw) as has been previously described. Included in the output data stream is rate of change data that can also be determined from the successive frames. For example, with flashed light sources 21 and matrix arrays for camera 1 (like the TN2500), very accurate velocity data can be obtained since the flashes can be precisely timed to one 30th of a second apart with 10 microseconds accuracy.

It goes without saying that other cameras viewing other sides of the cylinder head 2, such as auxiliary camera 70 in FIG. 1, can be used to look at the holes located on the bottom side in the drawing (which would be one of the intake manifold faces) and utilize those holes for positioning from another angle. If so desired, this can be in conjunction or in place of the camera 1. Separate processors RP, FEP and TP would be required. However, the photogrammetric equations could be solved by perhaps the same computer PP and fed to the control if indeed it was the same robot control. It could of course be another robot coming in from the other side to do other operations or to remove the part or what have you.

Figure 2:
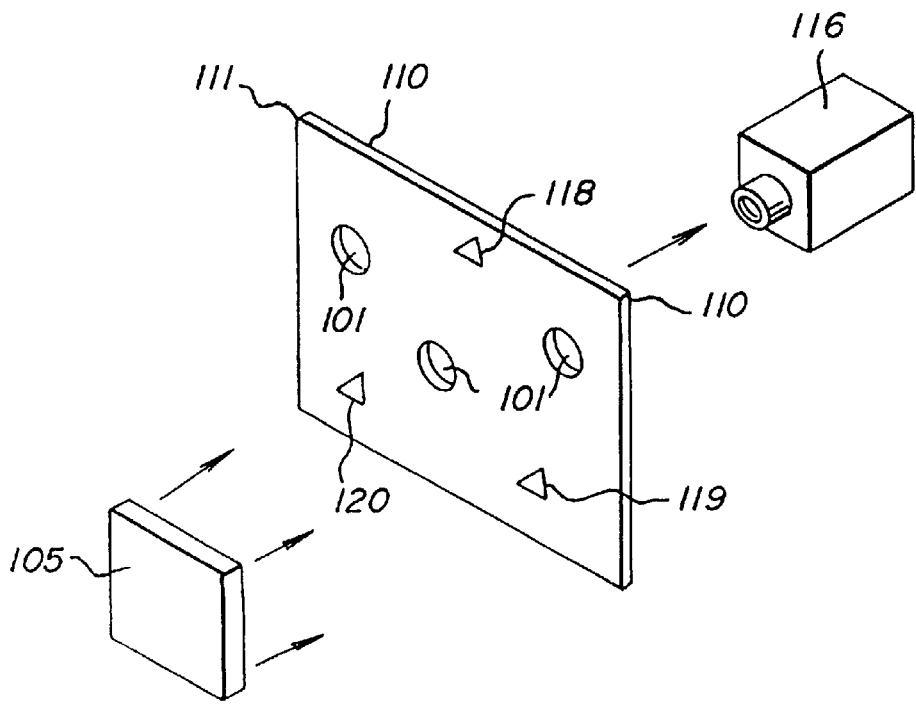
FIG. 2 illustrates a second embodiment of the invention using backlighting of sheet metal panel holes and corners and special triangle holes.

In FIG. 2, a formed sheet metal panel 100 with certain holes 101 in it can also be used in which case it is backlighted by light source 105 and viewed by camera 116 in a functionally equivalent manner to the system of FIG. 1. Naturally different panels and different locations can be so obtained. This case also illustrates the use of corners 110 and 111 as well.

Also illustrated is the punching into panel 100 of triangular shaped targets such as 118, 119 and 120 as shown. These targets are often viewed in reflection since the inner panel 100 is often welded at the time one wishes to look it into an outer panel (not shown).

The basic processing ideas shown above naturally would work with other kinds of targets such as painted on dots and the like. The idea of a recognition processor and front end processor are there only where required. If the targets however are so obviously visible that no recognition or front end processors are required, then clearly the target data can be immediately locked onto by the tracking processor TP. This is the case when very high contrast targets are used as in the Pinkney et al invention described above where the target dots simply appear at a threshold over the background. However, such a simple case (as in Pinkney) cannot be utilized when the holes indeed are black or where other black occurring objects including freespace are located around the part. Clearly, in that case, it is necessary to recognize the edges of the holes or the centroid of the hole if possible and from that determine the target location.

Various types of front end processors occur in the image processing art. Many utilize boundary conductivity and other algorithms to draw boundaries around parts, contrast enhancement techniques and other things to make the holes or other features more visible. It is not the intent here to re-invent these types of processors. It will be noted, however, that an excellent one for this type of data actually exists in the recent patents by the inventor and his co-workers on automatic flaw detection systems (see, for example, U.S. Pat. No. 4,305,661). Such processors can operate efficiently with reflected light and clearly serve to identify the holes as "flaws" in the presence of variable light fields, dirty sensor windows and the like. It is therefore clear that the preprocessors such as described in the flaws case can be utilized to scan these reflected part images to determine the hole-like features of the object from which further identification processors in the FEP 20 can be made in order to determine which item of the many holes located is to be considered a target.

A commercially available processor which can be used in some cases is the Machine Intelligence VS 100 processor derived from the work at SRI which has been published widely. A better choice is the Analog Devices IVS-1000 or the Hitachi HIDIC-IP.

The FEP itself can be considered to have two parts besides any recognition function RP. First, the processor is used to find the individual black appearing objects in the often very confusing field caused by the glints in light and dark features, dirt etc. on the part such as a cylinder head engine block, water pump or the like. Second, having once found these holes, a second processing step is then to pick out which ones are to be required from their location, size, and possible shape.

It is noted that sometimes the finding of holes can be considered to be quite difficult. For example, small blind holes in plastic instrument panels exist only in the webbing of the plastic at certain junctures and are rather dull in contrast compared to dark plastic instrument panels. This may require high intensity lighting and a particularly sophisticated form of image processing which tracks around the various path type features of the panel until finding the relative bulges where the blind holes occur. This is not necessarily the only way but it is just meant to illustrate that the processing for these "hole signatures" may have to be relatively sophisticated.

The beauty of the present invention is that, whatever the processor is, it can be dedicated to that one task—i.e. in this example to holes and particularly to only certain holes on that part or family of parts and nothing else. Therefore, what might be a very complex general purpose processor has here been reduced in scope to something extremely dedicated just to holes and possibly just to a class of holes. This is a great simplification.

FIG. 3 illustrates the segmentation of a matrix array image plane 202 into a 8×6 matrix of segments. Given the fact that many of these matrix arrays can have as many as 400×300 elements today, this matrix segment could be a segment of a 30×25 or even a 100×80 matrix array—whatever convenient segmentation is desired for the part in question.

The image of the rocker cover rail 200 viewed from the top at approximately a nominal range is shown with a segmented image. At this point, when one sees that the left edge 210 of the part is in the column 2 on the left hand side, one immediately knows from the part dimensions that the right edge of the part has to lie in column 5 or 6 on the right. Thus, one immediately can process down the the rows in column 2 until one finds the corner of the part as in row 3, column 2. In that location, one knows exactly that a hole must be near. One also can immediately find the other holes from the processing of the holes ignoring all other data that lies in columns 1, 3 and 4 as well as rows 1, 2 and 6. Obviously, this cuts down the number of pixels that have to be processed to obtain this data.

It is considered that if the cylinder head is not moving relative to the robot during the time that the target determination process is taking place, one can therefore immediately lock on the robot and literally keep the head in this general area of the image throughout the total hole tracking process as the robot closes in on the head for whatever purpose. The head either moving or being stationary. This way one never needs to process more than a few segments of data since one can actually dynamically, once the part is found, re-segment the part image so that the target windows lock on around the holes only and thereby ignore all the rest of the data in the image.

The windowing of the targets has been described somewhat in the Pinkney invention. Again, however, in this case the targets circuits of Pinkney actually cannot be used since the target images are too indistinct for simple thresholding to occur.

This brings up another point, namely the use of the present invention on moving parts. The front end processor has to actually take data back from the tracking processor to tell itself where to look, with the tracking processor then moving in conjunction with the front end processor to lock on the part. In this respect, the two are similar. Either that or the tracking processor has to have an ability to have some of the same fineness in seeing holes in a poor contrast background that the front end processor has.

Another point that has to be noted is that the robot can approach the target from a very oblique angle, in which case hole images could be very eliptical or otherwise less than ideal. In this case, the front end processor has to be able to locate the holes even in the presence of considerable variances in lighting. However, because a human is able to do this, it is considered likely that with suitable sophistication one can do this as well, automatically.

A very interesting point however—the human does not see the position of objects from the hole or target locations. The human eye with its stereo vision locks on features of the object in some way not totally known but it certainly does not lock on a particular set of holes and use them forever as the target locations. The invention is then operating in a way quite different from the human eye, but nonetheless effectively and in a sense similarly. However, for accuracy, the invention assumes an a priori knowledge of the hole or target spacings on the part —the human does not.

It goes without saying that multiple cameras can be used to look at a set of holes from two different angles to get a more stereo resolution. This can yield increased sensitivity to pitch and yaw compared to the single camera as well as improved depth dimension, although this is perhaps not as necessary.

Coincidence type techniques could be used too as shown in FIGS. 4A and 4B. If both cameras 300 and 301 identified a hole 310 or other feature at the correct location in their respective but angularly displaced fields of view (Θ), then the hole 310 could be considered a true reading. This is different than two camera stereo in that one is not solving for range per se, but using an approximate knowledge of range to establish a probability that the images are from the same desired feature.

Feature signatures useable with the invention (besides shape or size—e.g. hole diameter) include the modulated return in reflected light of light source 320 from threaded holes, (see for example U.S. Pat. No. 4,315,688 "Threads and Holes"). For holes on machined surfaces or light/dark/light, typical signatures exist with the dark zone of the signature being related to the hole diameter. For example, note signatures 300' and 301' in FIG. 4B as would be generated from respective cameras 300 and 301.

Other signatures include the radial scattering of light off of radiused surfaces such as rolled off edges of certain types of metal. The corners of such metal panels always have a radius which can be searched for too. On an assembly, the point where sheet metal panels meet can also be used as a target, as in where the trunk, quarter panel and rear part of the body meet. The point is actually defined by a 3 point line intersection in many cars. Other intersections would simply be the two line intersection of any corner of any panel of a car. Other parts fit this as well.

Figure 5A:
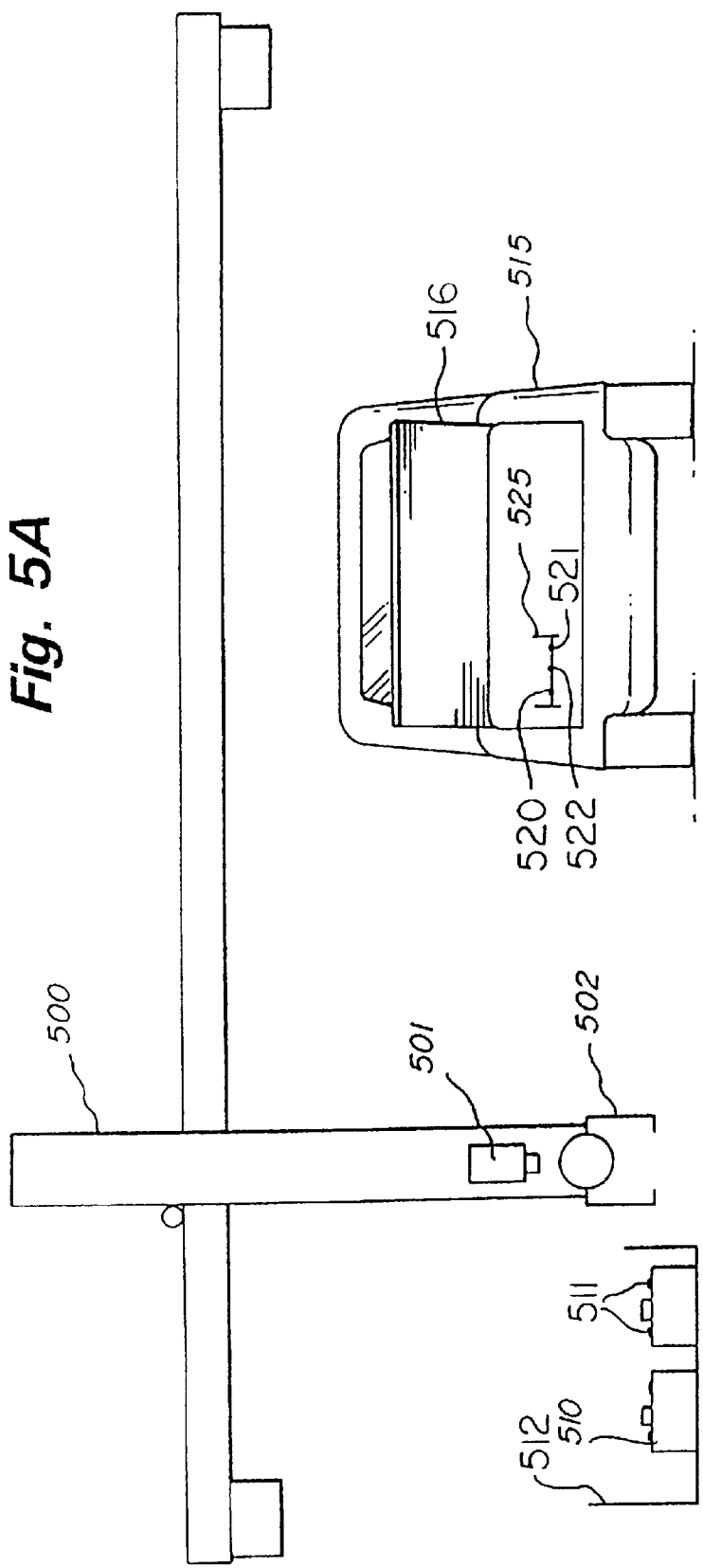
FIG. 5A schematically illustrates an embodiment making use of writing on a battery to guide a robot in installing the battery in a car.
Figure 5C:
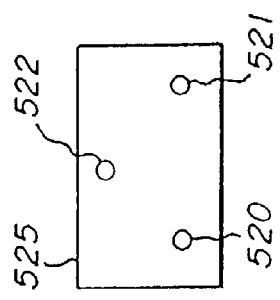
FIG. 5C is a top plan view of the battery box bottom shown in FIG. 5A.
Figure 5B:
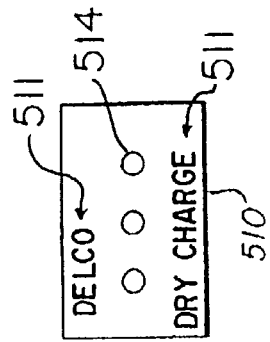
FIG. 5B is a top plan view of the battery shown in FIG. 5A.

Writing can also be used as a target as shown in FIGS. 5A and 5B. In such a case, a front end processor is used to identify lettering 511 on car batteries 510 located in a box 512. The FEP could then lock in on certain letters (such as "D" "D" and "C" of Delco Dry Charge as shown in FIG. 5B) which were to be used as targets. This would apply to a large number of things: tires, dash lettering, lettering on underhood wiring, etc. Additional "letters" such as crosses, dots, etc. could easily be put on many of such items as well, if desired.

As shown in FIG. 5A, a gantry robot 500 carrying a camera 501 and tooling 502 is picking up batteries 510 and installing them in moving (or stationary) cars 515 (hood 516 is up) using target points on the battery 510. Suitable target points include the writing 511 and/or the filler caps 514 on battery 510, and the 3 screw holes or contrasting screwheads 520, 521 and 522 in battery box bottom 525, as shown in greater detail in FIG. 5C. Screwheads 520, 521, and 522 are used to hold box bottom 525 to the chasis of car 515.

In this case, the FEP locks in on both certain letters on the battery 510 (for example, the two "D" letters and the "C" letter) to guide the robot to pick the battery 510 up, and the holes or screw heads 520, 521 and 522 in the case 525 to guide the robot when placing the battery 510 in the car 515. Typically 3, or better, 4 points are needed to establish a plane.

The use of screws as targets (chrome against a dark background) is interesting since one could purposely use fasteners and other hardware that provide such contrast.

This would be particularly easy in areas where aesthetic considerations did not apply (under a hood say), but this could actually add to the appearance in some cases. Block sheet metal screws against sheet metal is another possible target, the heads of which can generally be painted over anyway.

One can also project targets and use triangulation (e.g. see U.S. Pat. No. 4,373,804 "Turbine"). This can be in addition to target data on the part.

For example, suppose two target points gave x, y and z location, but were ambiguous on z and angle because of pitch/yaw considerations. In this case, one can project dots or other zones and observe their image on the part surface.

From this, an additional knowledge of range and/or attitude can be obtained which together with the target data allows accurate solutions for object location.

It is further noted that the object feature, be it holes, corners or whatever, should in general be a two dimensional object feature (having a length and width or an extension in 2 axes). If the minimum number of 3 target points are to be used to get a 6 degree of freedom solution, then each must be a two axis target. With more targets, some targets could be just one axis (e.g. a long edge).

It is noted that the invention generally uses a single camera to obtain in one view, 3 or 4 target images on an object. However, multiple views can be taken or multiple cameras used and the target locations combined.

It is also possible to use orientation codes as targets to help determine where the other targets or chosen features are. For example, to avoid the vision system having to search all through space, one could simply put one target onto a part, for example, a stick on "dot" that could be stuck on in a station (e.g. a machining operation) where the rest of the orientation of the part was known. This dot could carry an orientation code in it, in essence pointing (such as with dotted lines) at where the other features on the object were that should be used as targets.

Figure 6A:
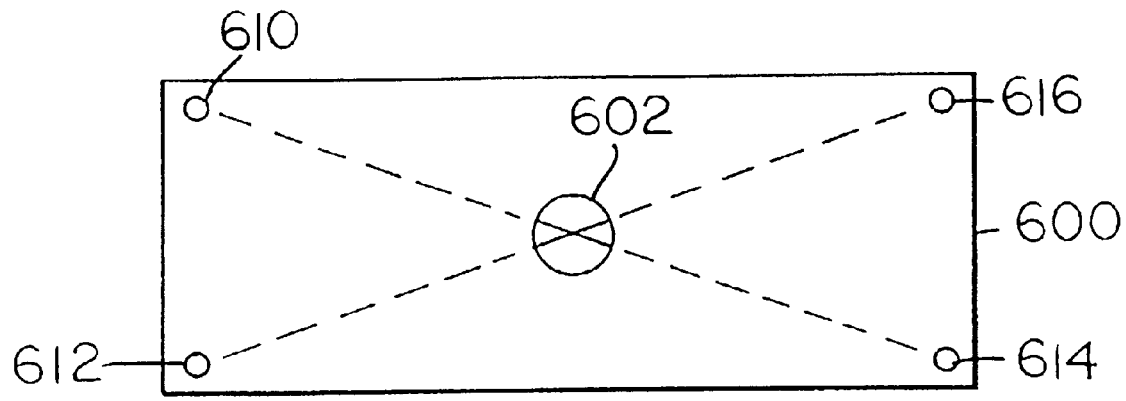
FIGS. 6A and 6B illustrate the use of a target location identified target on a part.
Figure 6B:
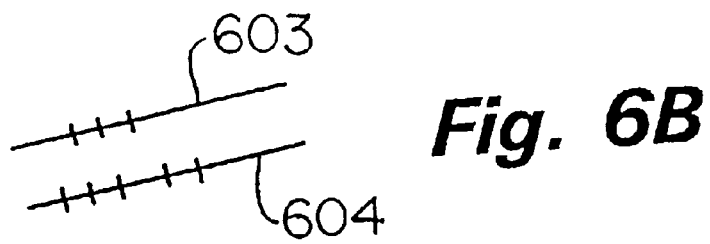

FIG. 6A illustrates the situation on a cylinder head 600. The target 602 could actually include a "pointer" such as a line at an angle as shown. Alternately, the target could be some sort of code scheme with bars 603 and 604 such as shown in FIG. 6B, or concentric lines, grids, even numerals, if readable. Such a target would tell where on the part the points of reference were. For example, three cross lines on bar 603 could mean 3" to the target, while five cross lines on bar 604 could mean 5" to the target. It could also identify the part. (Data as to target location would be called from a data base for that part).

If the identifier target was in the middle of the part, as on the head 600 shown, the target 602 (for example a crossed reticle) could say in effect that this part is a 4 cylinder cylinder head and head 600 has simply the xy references on it. Then one could easily go immediately via the crossed reticle to the points on that plane of the cylinder head 600 that had the holes 610, 612, 614, and 616. This is a very interesting point since it reduces the number of targets and allows one to more easily use the natural targets while also serving as a part identifier.

Figure 7:
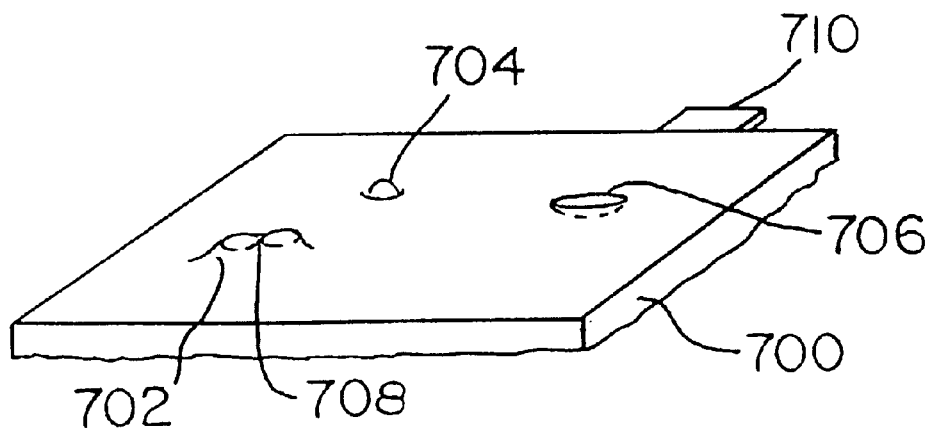
FIG. 7 illustrates cast in targets in a metal casting.

Another FEP application is to identify cast-in targets in metal casting 700 such as bumps 702, 704, 706, 710, or depression 706 or similar molded in targets on sheet metal or plastic as shown in FIG. 7. Here, contrast is often very poor. Thus, the more unusual the target molded in (e.g. reticle 708), the better the chance for a good signature.

It should be recognized that once one builds a hole type FEP processor, it would still be possible to use it on things that do not have holes. Thus, one could make artificial holes either by purposely putting them in, or by painting them on. In other words, what one could have was a general purpose machine that could be used with any target that is of a hole type. It is just that the front end processor is dedicated for a very distinct hole type target.

Commercially however, the idea of one single general purpose FEP, designed for the largest naturally occurring target case (i.e. holes), is appealing. It could be integrated on a VLSI chip with other components such as the matrix array, etc. If one did not have a hole, a simple dot target painted on or glued on would, with tuning, give an equivalent indication.

It is noted that additional holes or other features over and above the three needed to establish an object plane for guidance can be programmed into the front end processor to allow for backup in case any are unreadable.

The camera unit should be approximately positioned for best focus of the object image, and the automation can be servoed to accomplish this (or the lens moved to correspond to a given range data). However, even where moderately defocused, the FEP may be able to deduce the target feature locations at lease sufficiently to provide image information to allow further movement to bring the object into better focus. Large depth of field is desirable to minimize such problems.

Suitable tracking processors exist generally in the missile and space tracking art and to a degree are disclosed in Pinkney et al. In his invention, Pinkney places "windows" around the target images and produces signals which, though not disclosed, could allow, if required, a machine containing a camera to track the part physically so as to keep the targets in view.

The tracking function here is similar except that the signatures of the part feature can be much more complex, and potentially variant within the field of view of the camera. For this reason, a degree of intelligence is required in the tracking processor to discern the target. Thus, a portion of the standard image processing functions inherent in processors such as the Hitachi or Analog Devices ones mentioned earlier could be required. It is thought that very limited capability would be required in most instances, the main image processing job of acquiring the targets being accomplished by the FEP.

I claim:

1. A method for object position determination, said object having natural features and artificial targets, said method comprising the steps of:

providing a data base of said natural features and artificial targets of said object, selecting at least one of said features and at least one of said targets, providing an electro-optical system to acquire data from said selected features and targets, and analyzing data from said system to find said selected features and targets and determine their locations.

2. A method according to claim 1 wherein said electro-optical system comprises at least one TV camera.

3. A method according to claim 2 wherein at least two TV cameras are used to provide stereo information concerning the location of said features.

4. A method according to claim 1 wherein said object position in 3D space is determined.

5. A method according to claim 4 wherein said object position in space is calculated photogrammetrically.

6. A method according to claim 1 wherein range data to said object is first determined.

7. A method according to claim 1 wherein one feature is first found, and at least one other located therefrom using said data base.

8. A method according to claim 7 wherein at least two features are selected and said at least two selected features are different from one another.

9. A method according to claim 7 wherein said at least one selected feature comprises a corner, edge segment, notch or other feature which is definable in more than one dimension.

10. A method according to claim 7 wherein said selected features are redundant and alternative features.

11. A method according to claim 7 wherein said features are downloaded from a data base for a given part.

12. A method according to claim 7 further comprising determining the nature of the object.

13. A method according to claim 7 including processing to track said object features when said features are found.

14. A method according to claim 7 wherein said electro-optical sensor operates at 15 data readings/sec or greater.

15. A method according to claim 7 wherein said at least one selected feature is a hole, whose position is precisely known with respect to other object features of interest.

16. A method according to claim 15 wherein said hole centroid is determined.

17. A method according to claim 7 wherein edges of a object are located, and by using edge location information, said features are found.

18. A method according to claim 7 wherein said at least one selected feature is selected from a feature which is at least one of stamped or cast or other wise formed or impressed or colored into the surface of said object.

19. A method according to claim 18 wherein the signature of said at least one selected feature is obtained to identify its location.

20. A method according to claim 7 including the further step of providing a machine readable code on said object indicative of where said features are.

21. A method according to claim 7 wherein said at least one selected feature is a hole placed on said object to act as an optically visible feature.

22. A method according to claim 7 wherein two or more sensors are used to observe said object in the same zone, and coincidence in their output appears at the same point where a given characteristic or said at least one selected feature is selected.

23. A method according to claim 1 including the additional step of providing position information to a robot for manipulating or working said object.

24. A method according to claim 1 wherein said feature is a special feature put on said object to aid said position determination.

25. A method according to claim 1 wherein said position determination is simulated a priori.

26. A method according to claim 21 wherein said position is determined a plurality of times as a robot attempts to grab said object.

27. A method according to claim 1 wherein said analysis is performed using special processing for the feature or features to be acquired.

28. A method according to claim 1 wherein said analysis is also with target on tool or fixture.

29. A method according to claim 1 at least one of said features is a hole, corner, logo, indentation, protrusion, slot, or lettering.

30. A method according to claim 1 at least one of said features is projected onto said object.

31. A method according to claim 1 wherein three or more object features are used.

32. A method according to claim 1 including further step of selecting different features for different objects having the same data base.

33. A method according to claim 32 wherein alternative features are selected if one or more of said at least one selected features cannot be used.

34. A method according to claim 1 wherein said electro-optical system views a plurality of features simultaneously.

35. A method according to claim 1 wherein said at least one selected feature is an edge of said object.

36. A method according to claim 35 wherein said edge is the rolled edge formed by the intersection of two surfaces of a stamped object.

37. A method according to claim 1 wherein said data analysis step includes the step of determining a feature size, shape or reflectance characteristic.

38. A method according to claim 1 wherein illumination is used for said electro-optical system and is compensated to account for object reflectance, dirty windows or other variables.

39. A method according to claim 1 wherein illumination is used for said electro-optical system and is selected to accentuate said features.

40. A method according to claim 1 wherein an initial feature is found, and said data base is used to determine the region of search for additional features.

41. A method according to claim 1 including the further step of downloading data concerning said object from a CAD system.

42. A method according to claim 1 including the step of determining a characteristic of said at least one selected feature said characteristic allowing identification of said at least one selected feature.

43. A method according to claim 1 wherein said analysis is performed using a specialized processor.

44. A method according to claim 1 wherein said feature is designed in to be part of said object.

45. A method according to claim 1 wherein the field of scan of said electro-optical system is segmented to allow different feature processing within segments.

46. A method according to claim 1 wherein said object is in motion relative to said electro-optical system, and said data is acquired sufficiently rapidly.

47. A method according to claim 46 wherein said object is tracked.

48. A method according to claim 1 wherein said selected features of said object are found in the presence of other objects or features.

49. A method as in claim 1, further comprising determining, from said determined locations, the positions of further portions of said object.

50. A method for determining the position of a 3D object, said object having natural features and artificial targets, said method comprising the steps of:

providing a data base of natural features of said 3D object, selecting at least one of said features and at least one of said targets, providing an electro-optical system to acquire data from said at least one selected feature and target, analyzing the data from said system to find and determine the location of said at least one selected object feature and target, and from the locations of said at least one selected feature and target, determining the 3D position of said object.

51. Apparatus for determining the position of a 3D object, said object having natural features and artificial targets, said apparatus comprising;

means for storing design data concerning natural features of said object, means for selecting at least one of said features and at least one of said targets, electro-optical means to obtain data from said at least one selected feature and target, means to analyze said data to find said at least one selected feature and target on said object, means to analyze said data to determine the location of said at least one selected feature and target, and means for determining the 3D position of said object.

52. A method for determination of object position or orientation, said object having natural features and artificial targets, said method comprising the steps of:

provilding a data base of said natural features and artificial targets of said object, selecting a plurality of at least one of said features and at least one of said targets, providing an electro-optical system to acquire data from said selected features and targets, analyzing data from said system to find said selected features and targets and determine their locations, and from said determined locations, determining the position or orientation of said object.

* * * * *